United States Patent
Kordiak (12) 
(10) Patent No.: US 6,302,546 B1
(45) Date of Patent: Oct. 16, 2001

(54) SHOCK-ABSORBING, COLLAPSIBLE GLARE SHIELD FOR COMPUTER SCREENS AND METHOD OF USE

(76) Inventor: John A. Kordiak, 496 Ferry Rd., Orange, CT (US) 06477

( * ) Notice: Subject to any disclaimer, the term of this patent is extended or adjusted under 35 U.S.C. 154(b) by 0 days.

(21) Appl. No.: 08/758,295

(22) Filed: Dec. 3, 1996

Related U.S. Application Data (63) Continuation of application No. 08/430,867, filed on Apr. 28, 1995, now abandoned.

(51) Int. Cl.[7] .................................................. G02B 17/00
(52) U.S. Cl. ............................................ 359/608; 359/609
(58) Field of Search ................................... 359/601, 608, 359/609; 348/832, 834, 835, 842

(56) References Cited

U.S. PATENT DOCUMENTS

| | | | |
|---|---|---|---|
| 4,314,280 | * 2/1982 | Rose | 358/255 |
| 4,444,465 | * 4/1984 | Giulie et al. | 350/276 R |
| 4,569,572 | 2/1986 | Kopich | 350/276 R |
| 4,633,324 | * 12/1986 | Giulie | 358/252 |
| 4,784,468 | 11/1988 | Tierney | 350/276 R |
| 4,865,420 | 9/1989 | Schmidt | 350/276 R |
| 5,101,298 | * 3/1992 | Lentz et al. | 359/612 |
| 5,115,345 | * 5/1992 | Hobson et al. | 359/601 |
| 5,121,253 | 6/1992 | Waintroob | 359/601 |
| 5,218,474 | * 6/1993 | Kirschner | 359/601 |
| 5,355,279 | 10/1994 | Lee et al. | 361/681 |

* cited by examiner

*Primary Examiner*—Jung Ho Kim
(74) *Attorney, Agent, or Firm*—John H. Crozier (57) ABSTRACT

In a preferred embodiment, a glare shield for a portable display screen, the display screen having a display surface with a top edge and first and second sides, the shield including: a material substantially surrounding the top edge and the first and second sides of the display surface and extending from the display surface, the shield being being constructed so as to be deformable in the event of the application of an external force, so as to absorb at least a portion of the external force to protect the display screen therefrom; and the glare shield being removable from the display screen and foldable substantially flat when not in use.

7 Claims, 11 Drawing Sheets

SHOCK-ABSORBING, COLLAPSIBLE GLARE SHIELD FOR COMPUTER SCREENS AND METHOD OF USE

This application is a continuation, of application Ser. No. 08/430,867, filed Apr. 28 1995, now abandoned.

BACKGROUND OF THE INVENTION

1. Field of the Invention

The present invention relates to computers generally and, more particularly, but not by way of limitation, to a novel shield for computer screens which is particularly useful with laptop computers and similar devices.

2. Background Art

Portable computers, data displays, "paperless newspapers," and similar devices have become very popular because of their ease of portability and because recent advances in computer and communication technology have resulted in some quite versatile machines.

A problem with such devices is that the low-power display screens employed in connection therewith can be difficult to read when the devices are used outdoors, for example, partly because of the level of ambient illumination and partly because of glare from light sources. The same problem can exist, to some extent, also, when the devices are used indoors in brightly lighted locations.

A number of shields, or hoods, have been developed to address the above problem; however, none of these is completely satisfactory for one or more of a number or reasons. First, many of such shields are rigid, thus transmitting to the display screen any external force that is applied to the shields. Second, none of the shields can be folded or easily disassembled to be substantially flat. Although portable computers and similar devices are usually relatively compactly arranged when not in use and can be put in small carrying cases, the rigid hoods cannot be placed in the carrying cases with the computers. Additionally, in many cases, attachment of the shields requires that something be glued or otherwise relatively permanently attached to the display screens.

Accordingly, it is a principal object of the present invention to provide a shield for a portable computer display screen or similar devices that can absorb forces applied thereto so as to insulate the display screen therefrom.

A further object of the invention is to provide a shield for a display screen which can be folded or disassembled to be substantially flat so that it can be carried in a portable computer carrying case.

It is another object of the invention to provide a shield for a display screen which does not require attachment of a fixture to the display screen. Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a glare shield for a portable display screen, said display screen having a display surface with a top edge and first and second sides, said shield comprising: a material substantially surrounding said top edge and said first and second sides of said display surface and extending from said display surface, said shield being being constructed so as to be deformable in the event of the application of an external force, so as to absorb at least a portion of said external force to protect said display screen therefrom; and said glare shield being removable from said display screen and foldable substantially flat when not in use.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figure 1:
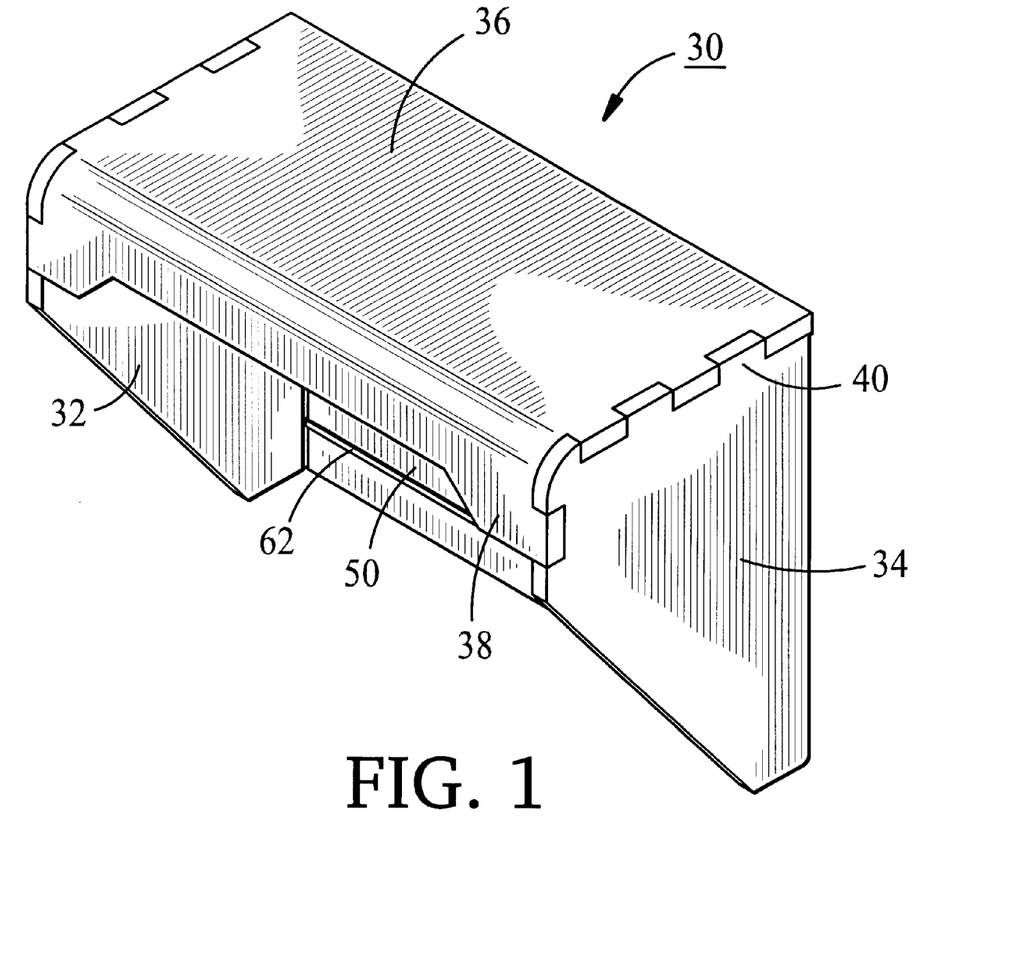
FIG. 1 is an isometric view of one embodiment of a display screen shield according to the present invention.
Figure 4:
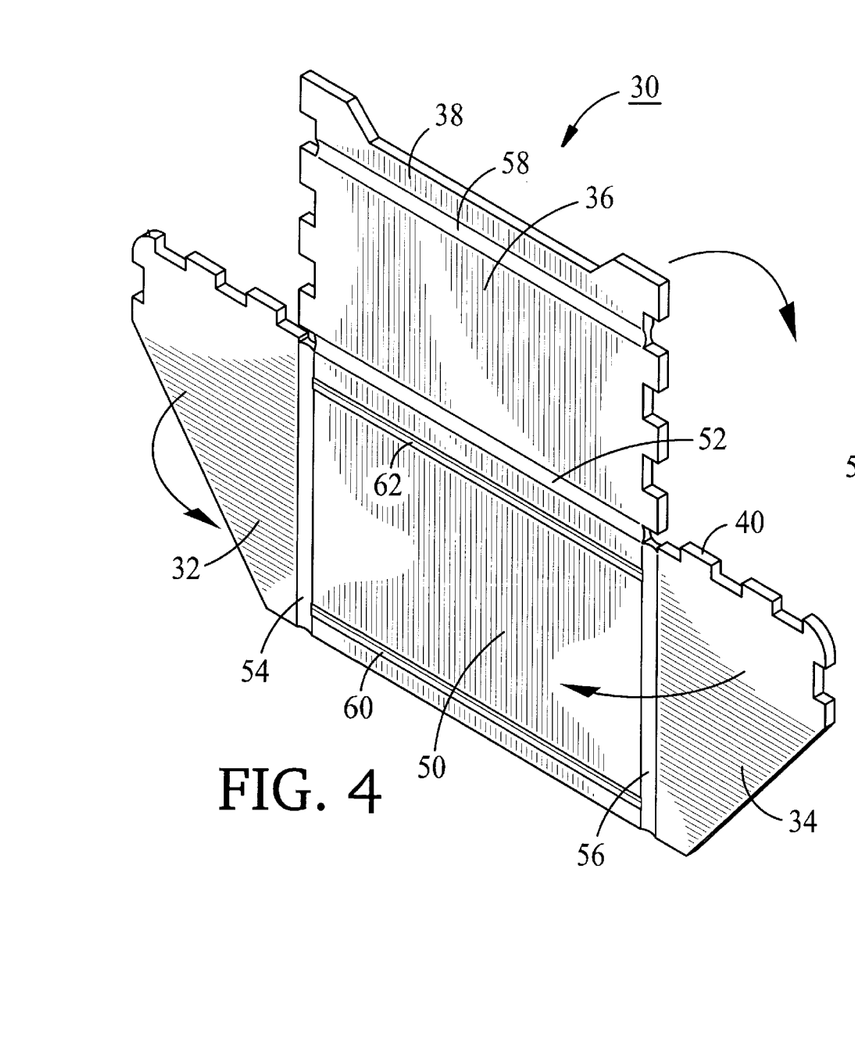
FIG. 4 is an isometric view indicating how the shield of FIG. 1 is folded.

Referring now to FIG. 1, there is illustrated a display screen shield according to one embodiment of the present invention, generally indicated by the reference numeral 30. Shield 30 includes first and second side walls 32 and 34, respectively, a top wall 36, and a short front wall 38 depending from the front edge of the top wall. Side walls 32 and 34, top wall 36, and front wall 38 are cojoined by means of frictionally interleaved projections, as at 40, formed along adjacent edges of the walls. Referring for a moment to FIG. 4, shield 30 also includes a back wall 50 attached to top wall 36 by means of a hinge portion 52 and attached to first and second side walls 32 and 34 by means of hinge portions 54 and 56, respectively. Front wall 38 is joined to top wall 36 by means of a hinge portion 58. Hinge portions 52, 54, 56, and 58 permit the walls of the shield to be rotated to the assembled positions shown on FIG. 1. Also shown on FIG. 4 are first and second horizontal elastic straps 60 and 62, respectively, disposed near the lower and upper edges of back wall 60, respectively.

Figure 2:
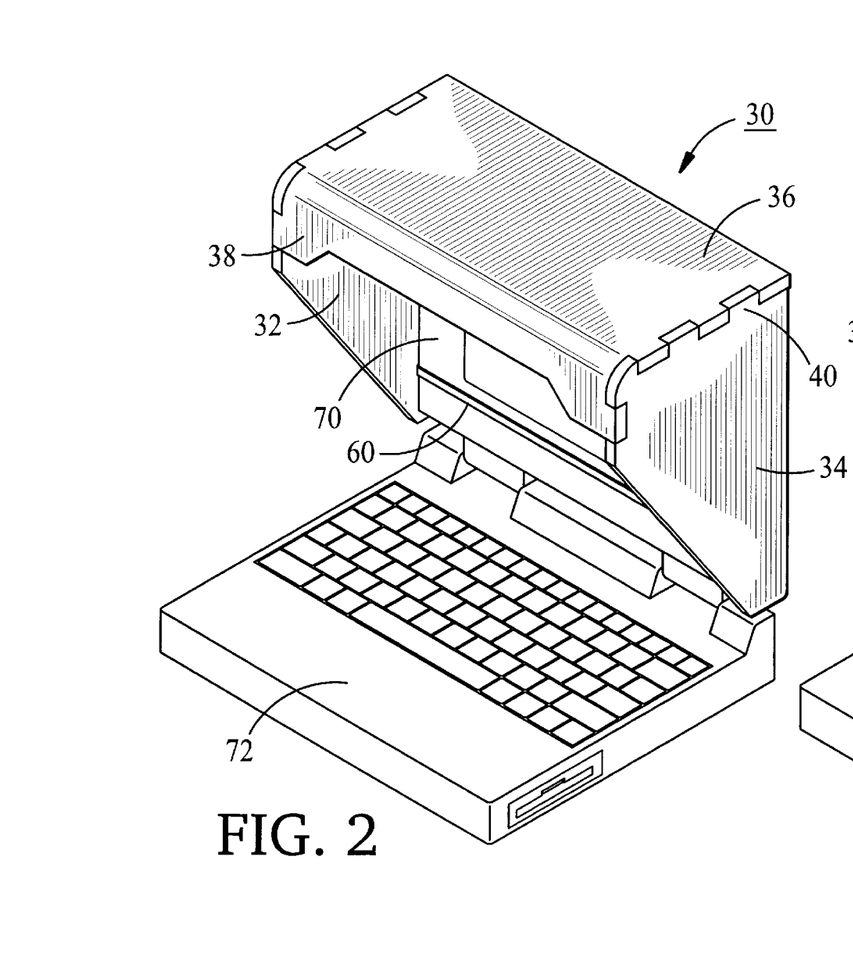
FIG. 2 is an isometric view of the shield of FIG. 1 installed on a display screen of a portable computer.

FIG. 2 illustrates shield 30 installed on a display screen 70 which, for illustrative purposes only is shown as being associated with a portable computer 72. It will be understood that display screen 70 could, as well, be associated with any small, portable computational or communications device. Shield 30 is yieldingly held in place on display screen 70 by means of elastic strap 60 being stretched around the display screen. It will be understood that elastic strap 62 (FIG. 4) is similarly stretched around display screen 70. So placed, shield 30 greatly reduces the effects of ambient lighting and glare and renders display screen 70 much easier to use.

Figure 3:
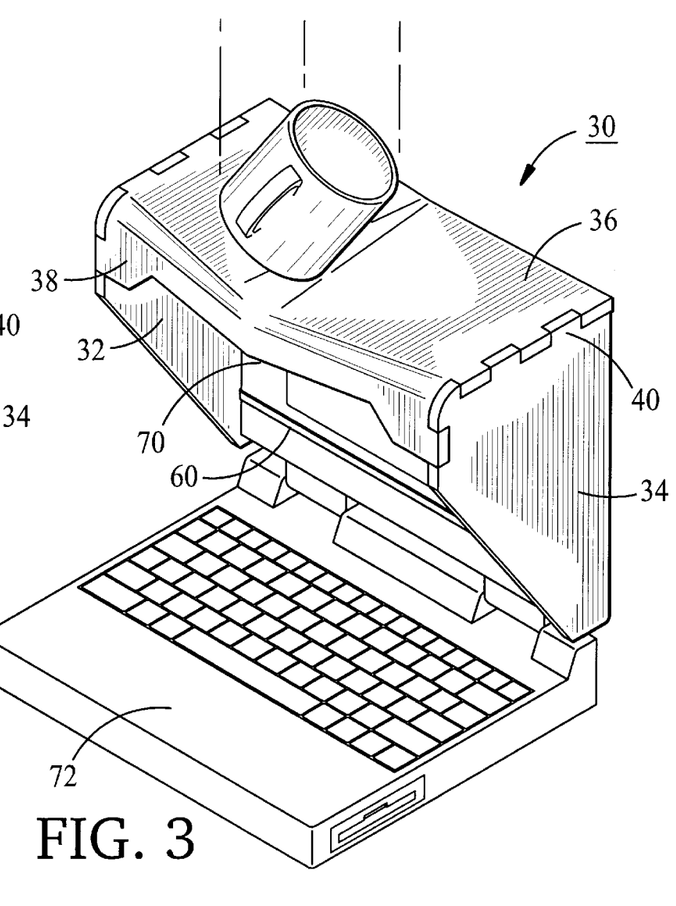
FIG. 3 is an isometric view of the shield of FIG. 2 absorbing an external force.

Shield 30 is constructed of a highly yieldable material so as to absorb external forces and prevent damage to display screen 70. This is illustrated on FIG. 3 where the material of shield 30 is seen to be highly deformable so as to absorb the external force. Additional yielding of shield 30 may be afforded, if necessary to absorb the force, by the separation of projections 40 and/or the stretching of elastic straps 60 and/or 62. Thus, screen 70 is protected against having damaging external forces applied to it through shield 30.

Figure 5:
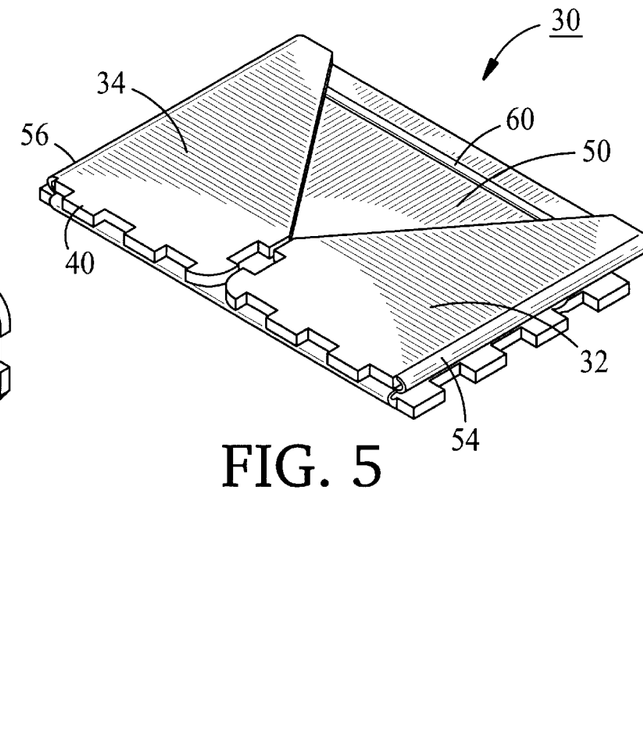
FIG. 5 is an isometric view showing the shield of FIG. 1 folded substantially flat.

Another desirable feature of shield 30 is that it can be folded substantially flat for convenient insertion in carrying case. This is illustrated on FIGS. 4 and 5. FIG. 4 shows shield 30 with side walls 32 and 34, top wall 36, and front wall 38 with interleaved projections 40 separated. Now, top wall 36 can be folded against the rear surface of back wall 50 and side walls 32 and 34 can be folded against the front surface of the back wall. Such as folded configuration is illustrated on FIG. 5.

Figure 6:
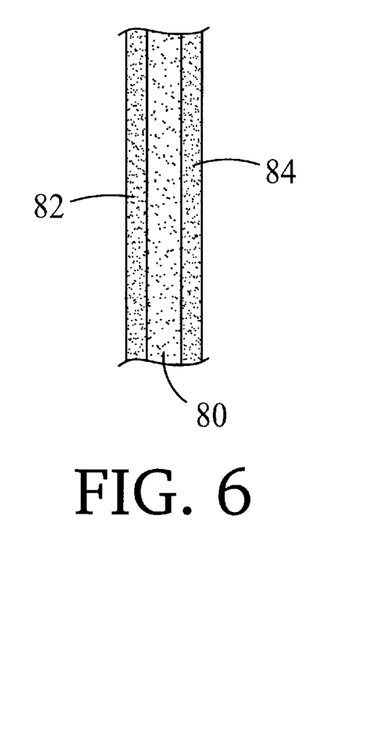
FIG. 6 is a fragmentary, enlarged, cross-sectional view of the material of construction of the shield of FIG. 1.

Shield 30 is constructed of a material that is highly deformable, yet has sufficient rigidity to retain its form when not subjected to external forces. A preferred material is illustrated on FIG. 6 and comprises a composite having a 3-mm thick core 80 of a closed cell, extruded polyethylene foam material, such as Ethafoam as furnished by Dow Chemical & Plastics Company, with outer 2-mm thick layers 82 and 84 of flocked polyurethane attached thereto with a suitable adhesive.

Figure 7:
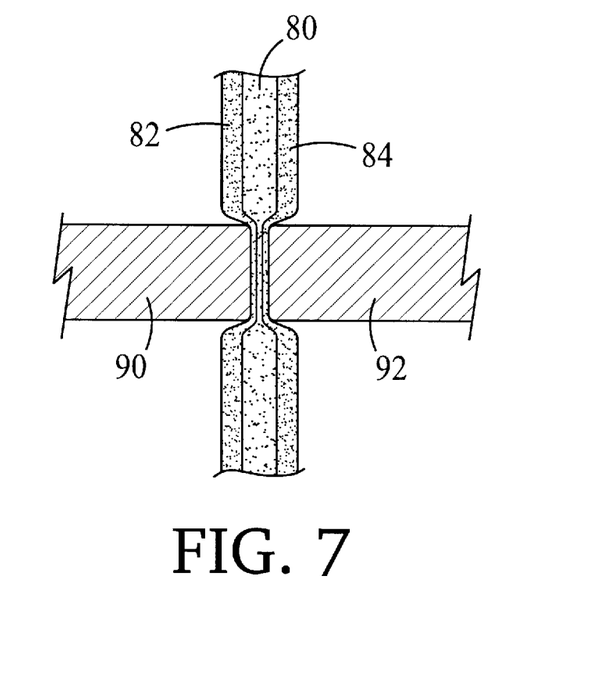
FIG. 7 is a fragmentary, enlarged, cross-sectional view illustrating the method of forming the hinge portions for the shield of FIG. 1.

FIG. 7 illustrates the method of forming hinge portions 52, 54, 56, and 58. Here, heated plates 90 and 92 of suitable metallic material, such as aluminum, are applied to opposite sides of the composite material of FIG. 6 and pressed together for a brief period of time. When plates 90 and 92 are removed, the composite material will retain the shape shown on FIG. 7, thus forming a relatively thin, flexible hinge.

Figures 8, 9:
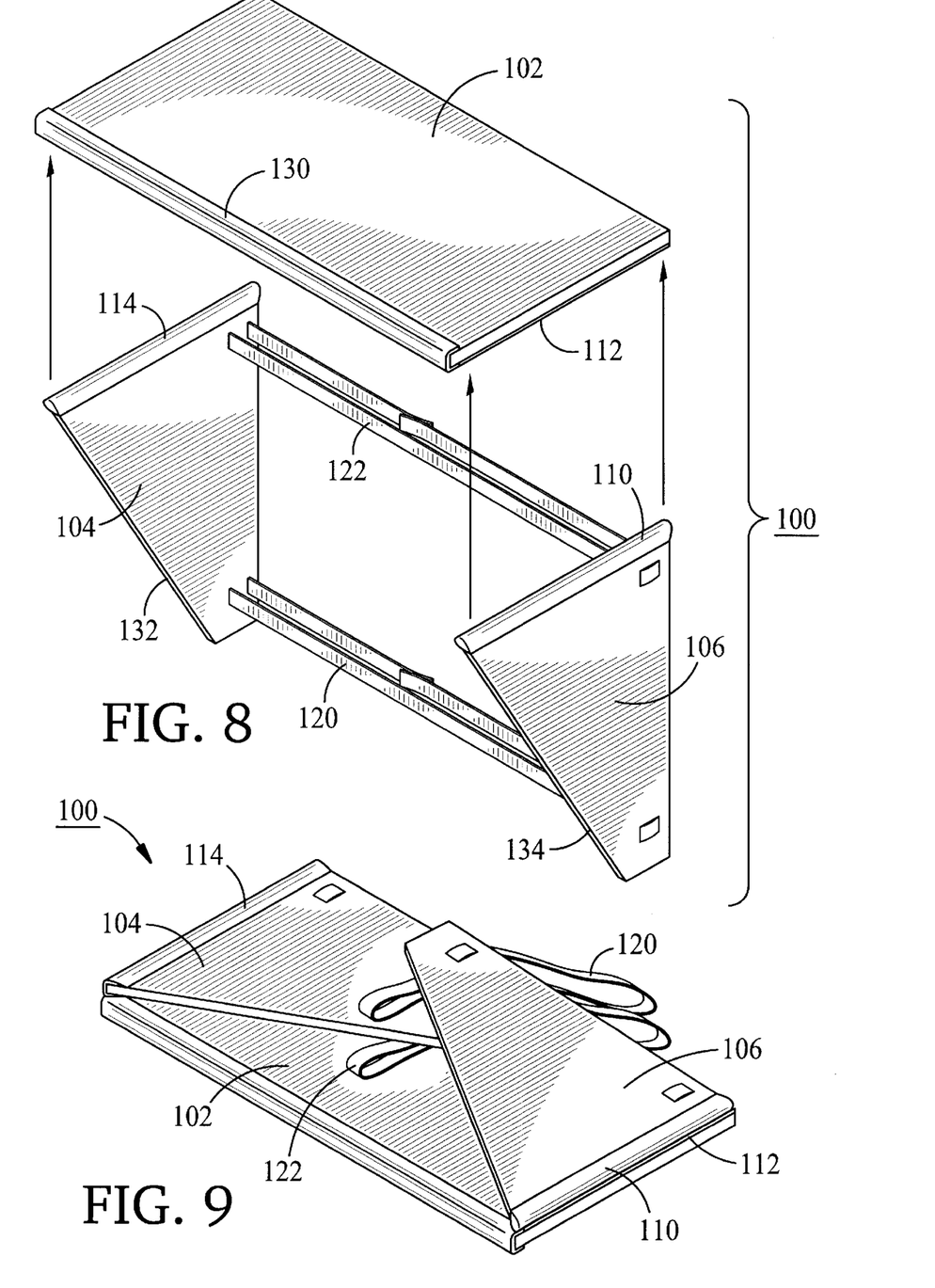
FIG. 8 is an exploded, isometric view illustrating the construction of another embodiment of a display screen shield according to the present invention.
FIG. 9 is an isometric view of the shield of FIG. 8 folded substantially flat.

FIG. 8 illustrates another display screen shield constructed according to another embodiment of the present invention, generally indicated by the reference numeral 100. Shield 100 includes a top wall 102 and first and second side walls 104 and 106. Side wall 106 has a strip of hook-and-loop fabric 110 wrapped around the upper edge thereof and is releasably attached to top wall 102 by engagement of strip 110 with a complementary strip of hook-and-loop fabric 112 disposed on the lower surface of top wall 102 near one edge thereof. A similar strip of hook-and-loop fabric 114 is wrapped around the upper edge of side wall 104 and releasably engages a similar complementary strip of hook-and-loop fabric (not shown) disposed near the other edge of top wall 102. First and second elastic bands 120 and 130 are attached to and extend between side walls 104 and 106. When assembled, shield 100 can be placed on a display screen in a manner similar to shield 30 on display screen 70 (FIG. 1), with elastic straps 120 and 122 encircling the display screen. The hook-and-loop fabric attachment arrangement permits some horizontal leeway in accommodating different display screens of different widths.

The material of construction of shield 100 is the same as that of shield 30 (FIGS. 1–6) and will deform to absorb an external force applied thereto. Additionally, one or both hook-and-loop attachments may separate under the external force and stretching of elastic straps 120 and 122 will further absorb the force.

Shield 100 may be folded substantially flat by removing side walls 104 and 106 from top wall 102 and reattaching them in the positions shown on FIG. 9.

Figure 10:
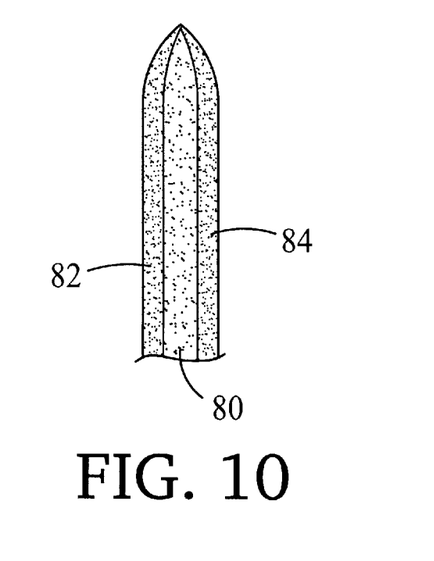
FIG. 10 is a fragmentary, enlarged, isometric view illustrating a tapered edge of the shield of FIG. 8.

The front edge of top wall 102 is finished with a strip of hook-and-loop fabric 130 and the front edges 132 and 134 of side walls 104 and 106 are finished with a taper. The latter feature is shown on FIG. 10. The taper may be produced by applying hot-melt adhesive and clamping force to the edge of the composite material or it may be produced using a procedure similar to that illustrated on FIG. 7.

Figures 11, 12:
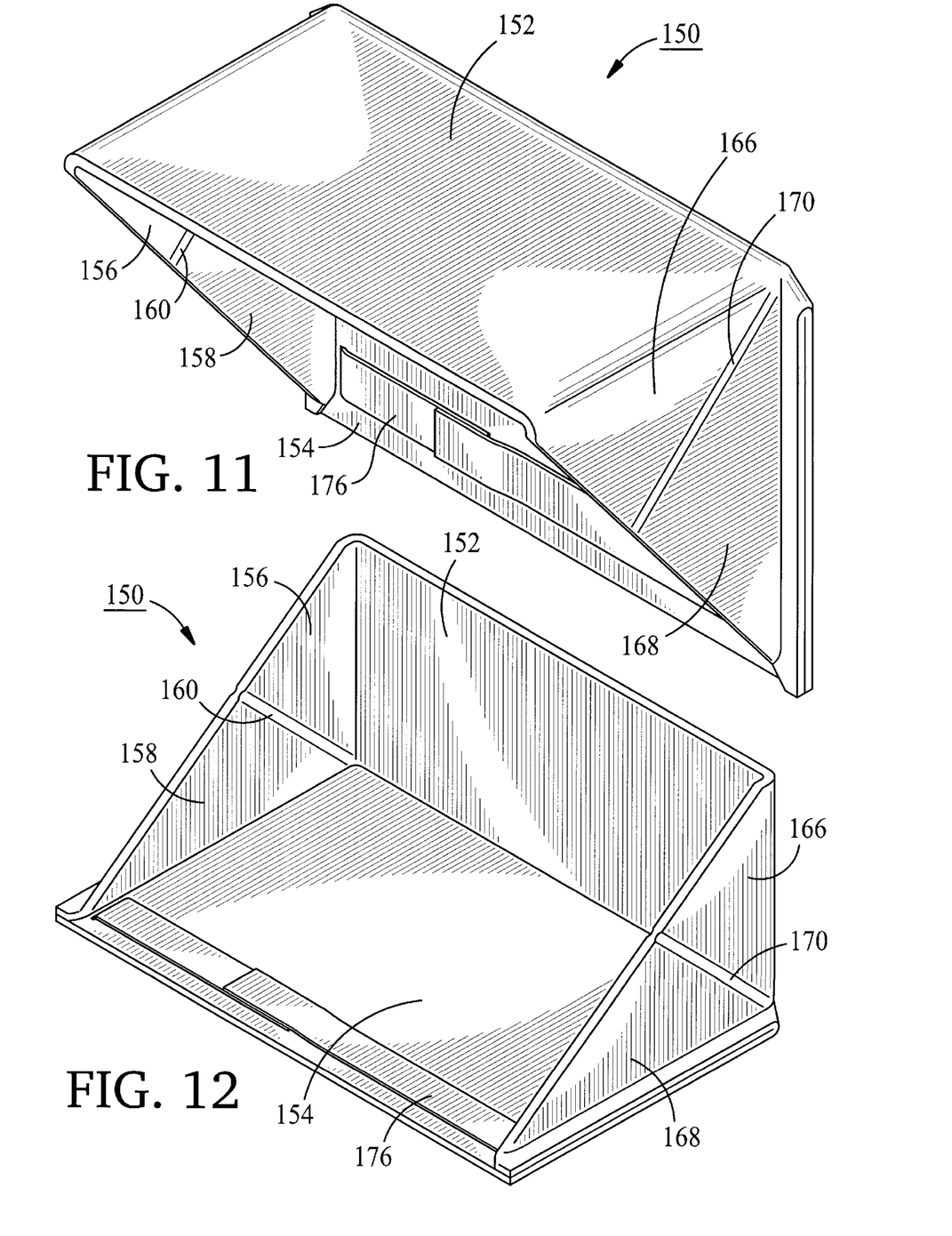
FIG. 11 is an isometric view illustrating a further embodiment of a display screen shield according to the present invention, arranged for installation on a display screen.
FIG. 12 is an isometric view of the shield of FIG. 11 preparatory to folding the same.

FIG. 11 illustrates a display screen shield constructed according to a further embodiment of the present invention, generally indicated by the reference numeral 150. Shield 150 includes a top wall 152 hingedly attached to a back wall 154, a left side wall comprising upper and lower panels 156 and 158 joined at a hinge portion 160, and a right side wall comprising upper and lower panels 166 and 168 joined at a hinge portion 170, the side walls being hingedly joined to the back wall. An elastic strap 176 extends horizontally along the lower edge of back wall 154. In its upright position, shown on FIG. 11, shield 150 can be placed on a display screen in a manner similar to shield 30 on display screen 70 (FIG. 1).

The panel members of shield 150 are fabric covered, resilient cardboard and the hinge members are sections of the fabric covering under which there is no cardboard substrate. Thus, when an external force is received by shield 150, the cardboard can yield, the hinges can yield, and the elastic band can stretch, all absorbing the force and protecting the display screen.

Figure 13:
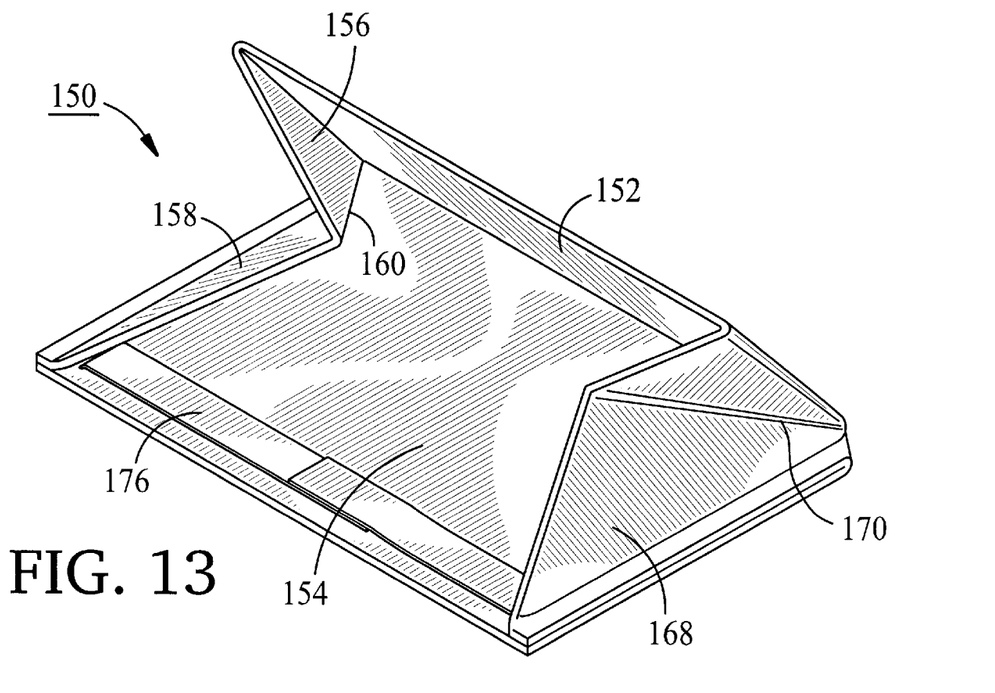
FIG. 13 is an isometric view illustrating the screen of FIG. 11 being folded.
Figure 14:
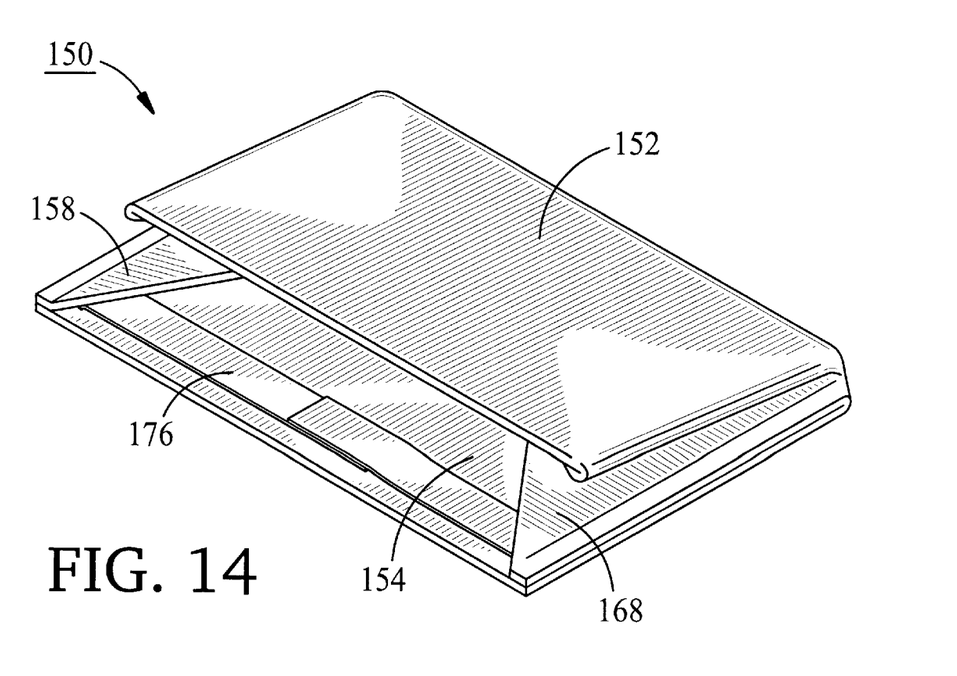
FIG. 14 is an isometric view illustrating the screen of FIG. 11 folded substantially flat.

Shield 150 can be folded substantially flat, as is illustrated on FIGS. 12–14. On FIG. 12, shield 150 has been positioned with back wall 154 disposed horizontally. Then, hinge portions 160 and 170 are pressed inwardly, as illustrated on FIG. 13. Finally, top wall 152 is folded downwardly to a nearly horizontal position.

Figures 15, 16:
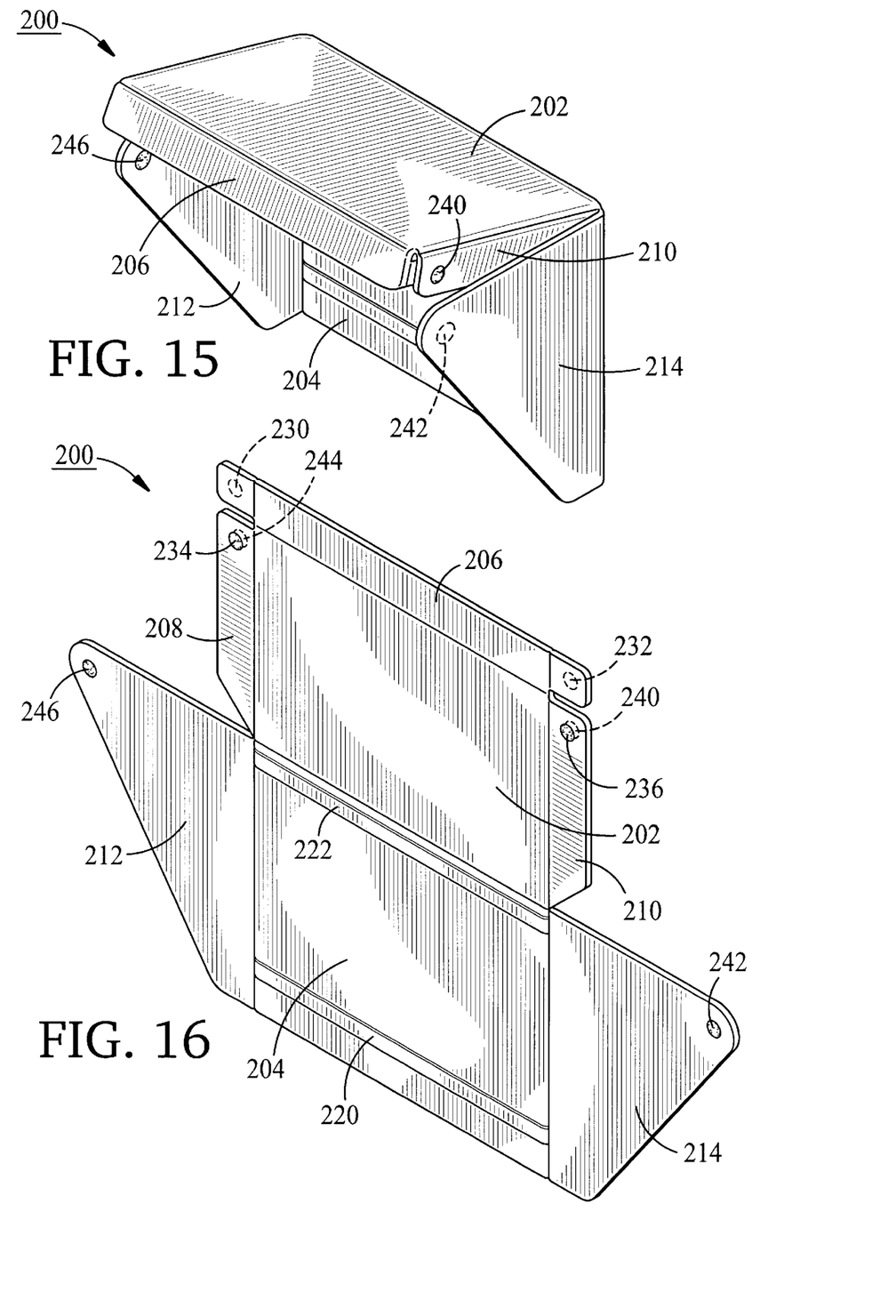
FIG. 15 is an isometric view illustrating yet another embodiment of a display screen shield according to the present invention.
FIG. 16 is an isometric view illustrating the shield of FIG. 15 in the process of being folded.

FIG. 15 illustrates a display screen shield constructed according to another embodiment of the present invention, generally indicated by the reference numeral 200. Shield 200 includes a top wall 202 hingedly joined to a back wall 204, a short front wall 206 hingedly joined to the top wall, first and second intermediate side walls 208 and 210, respectively, hingedly joined to the sides of the top wall, and first and second primary side walls 212 and 214, respectively, hingedly joined to the sides of the back wall. First and second horizontal elastic straps 220 and 222, respectively, are disposed along the inner surface of back wall 204 near the lower and upper edges thereof, respectively. The panel members and hinge portions of shield 200 are constructed similarly to the panel members and hinge portions of shield 150 (FIG. 11).

Referring also to FIG. 16, shield 200 is assembled by bending front wall 206 and first and second intermediate side walls 208 and 210 orthogonally to top wall 206 and releasably joining hook-and-loop fabric circles 230 and 232 on front wall 206 to hook-and-loop fabric circles 234 and 236 on intermediate side walls 208 and 210, respectively. Then primary side walls 212 and 214 are bent orthogonally to back wall 204 and a hook-and-loop fabric circle 240 on intermediate side wall 210 is releasably joined to a hook-and-loop fabric circle 242 on primary side wall 214. Likewise, a hook-and-loop fabric circle 244 on intermediate side wall 208 is releasably joined to a hook-and-loop fabric circle 246 on primary side wall 212. In addition to the external force absorbing properties described above with reference to display screen shields 30 (FIG. 1) and 150 (FIG. 8), the various hook-and-loop fabric circles of shield 200 are easily released to provide further shock absorbing action.

Figure 17:
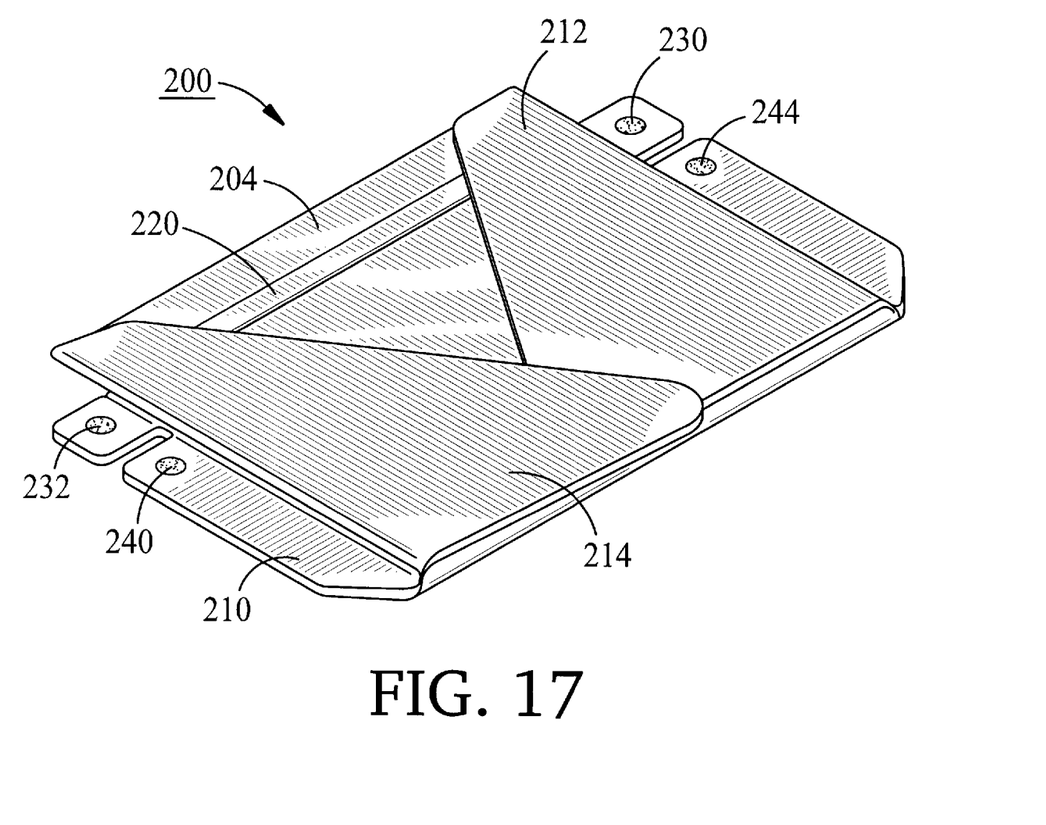
FIG. 17 is an isometric view illustrating the shield of FIG. 15 folded substantially flat.

Shield 200 may be folded substantially flat as is illustrated on FIG. 17.

Figures 18, 19:
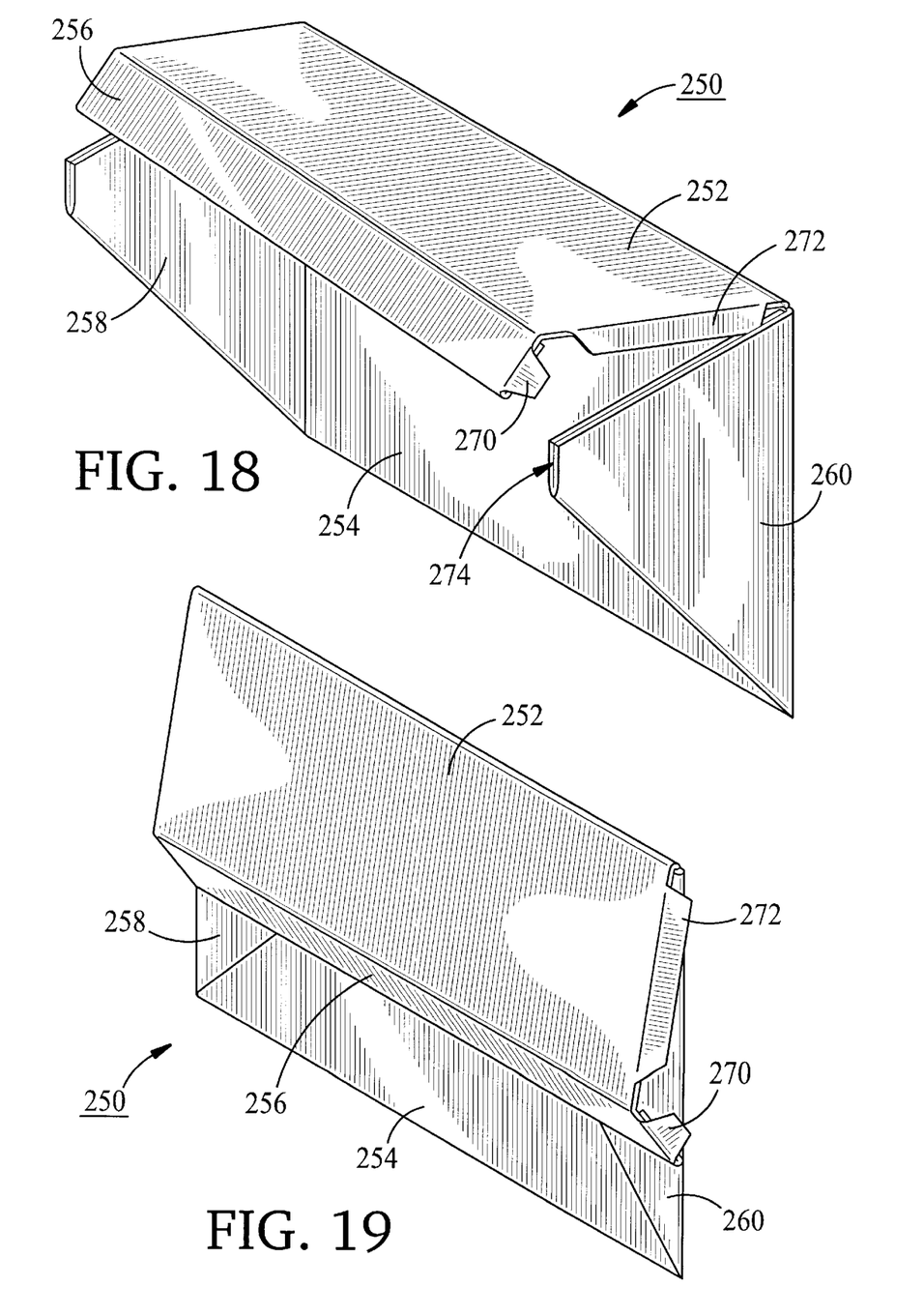
FIG. 18 is an isometric view illustrating yet a further embodiment of a display screen shield according to the present invention.
FIG. 19 is an isometric view illustrating the shield of FIG. 18 folded substantially flat.

FIG. 18 illustrates a display screen shield constructed according to yet a further embodiment of the present invention, generally indicated by the reference numeral 250, the shield being constructed of a single sheet of lightweight cardboard. Shield 250 includes a top wall 252 hingedly attached to a back wall 254, a short front wall 256 hingedly attached to the top wall, and first and second side walls 258 and 260, respectively, hingedly attached to the back wall. FIG. 19 illustrates shield 250 folded substantially flat.

Figure 21:
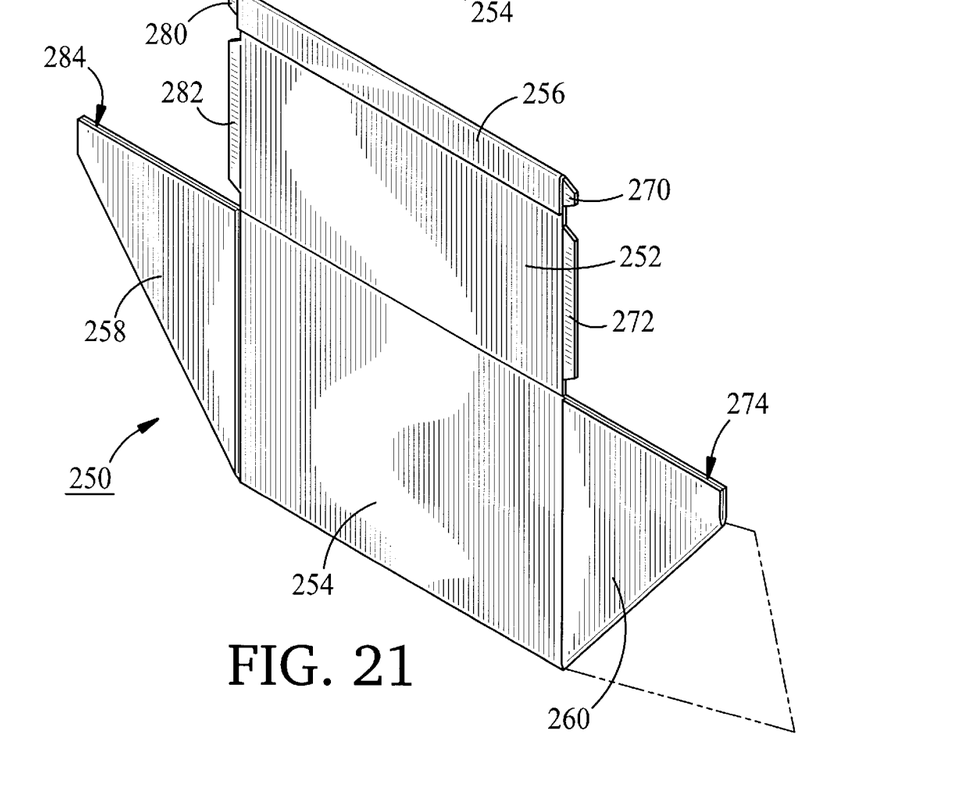
FIG. 21 is an isometric view illustrating the method of constructing the shield of FIG. 18 from the sheet of material of FIG. 20.

As shown on FIG. 18, top wall 252, front wall 256 and side wall 260 are joined by means of the frictional, releasable insertion of a tab 270 formed on one end of the front wall and a tab 272 formed on one edge of the top wall into a slot 274 defined in the upper edge of side wall 260. Similarly, with reference to FIG. 21, a tab 280 formed on the other end of front wall 256 and a tab 282 formed on the other edge of top wall 252 are frictionally, releasably inserted in a slot 284 defined in the upper edge of side wall 258. In addition to the bending of the panels of shield 250 in the event of an external force applied thereto, many external forces will also cause the partial or complete disassembly of the shield to further protect a display screen from the external force. Score lines, as at 290, a re provided to assist in the fabrication of shield 250. Side panels 258 and 260 and front panel 256 are formed by folding and gluing together the elements shown, with the material forming slots 274 and 284 of side walls 260 and 258, respectively, remaining unglued.

Figure 20:
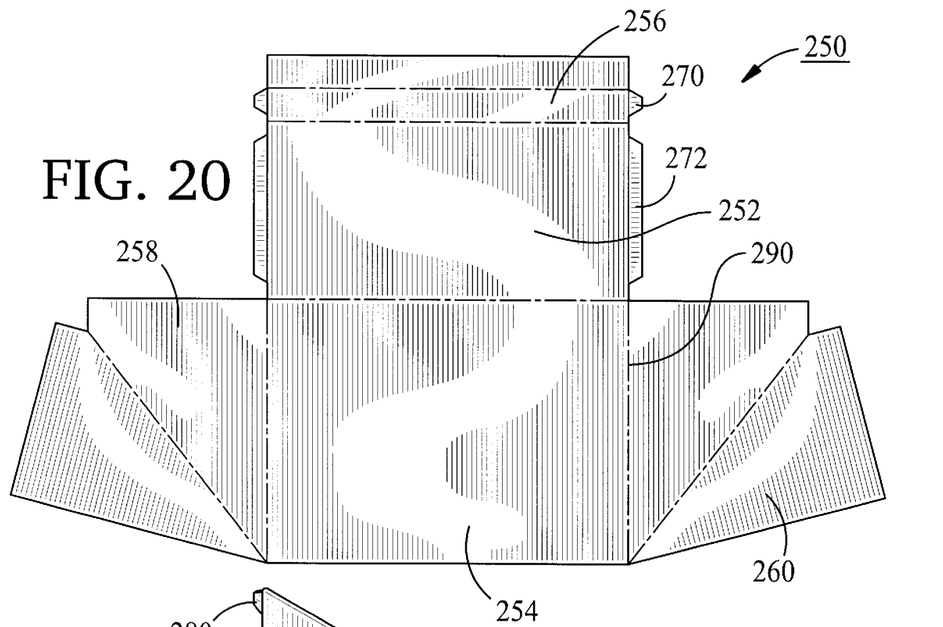
FIG. 20 is a top plan view illustrating a single sheet of material from which the shield of FIG. 18 can be constructed.

FIG. 20 illustrates how a s ingle sheet of lightweight cardboard may be die cut from a single sheet of material.

It will thus be seen that the objects set forth above, among those elucidated in, or made apparent from, the preceding description, are efficiently attained and, since certain changes may be made in the above construction with out departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A glare shield for a portable display screen, said display screen having a display surface with a top edge and first and second sides, said shield comprising:

(a) material, having top and first and second sides, substantially surrounding, respectively, said top edge and said first and second sides of said display surface and extending from said display surface;

(b) said shield being being constructed so as to be deformable in the event of the application of an external force, to absorb at least a portion of said external force to protect said display screen therefrom; and (c) said shield being releasably attached to said display screen by elastic means and said elastic means can stretch to absorb at least a portion of said external force.

2. A glare shield for a portable display screen, said display screen having a display surface with a top edge and first and second sides, said shield comprising:

(a) material, having top and first and second side walls, substantially surrounding, respectively, said top edge and said first and second sides of said display surface and extending from said display surface;

(b) said shield being being constructed so as to be deformable in the event of the application of an external force, to absorb at least a portion of said external force to protect said display screen therefrom; and (c) said first and second side walls being releasably joined to said top wall by means of interleaved tabs.

3. A glare shield for a portable display screen, said display screen having a display surface with a top edge and first and second sides, said shield comprising:

(a) material, having top and first and second side walls, substantially surrounding, respectively, said top edge and said first and second sides of said display surface and extending from said display surface;

(b) said shield being being constructed so as to be deformable in the event of the application of an external force, to absorb at least a portion of said external force to protect said display screen therefrom; and (c) said first and second side walls being releasably joined to said top wall by means of hook-and-loop fabric material.

4. A glare shield, as defined in claim 2, wherein: said top wall and said first and second side walls are rotatably joined to a back wall by means of integral hinge sections.

5. A glare shield, as defined in claim 3, wherein: said top wall and said first and second side walls are rotatably joined to a back wall by means of integral hinge sections.

6. A glare shield for a portable display screen, said display screen having a display surface with a top edge and first and second sides, said shield comprising:

(a) a material substantially surrounding said top edge and said first and second sides of said display surface and extending from said display surface, said shield being being constructed so as to be deformable in the event of the application of an external force, so as to absorb at least a portion of said external force to protect said display screen therefrom;

(b) said material including a top wall and first and second side walls, said first and second side walls being releasably joined to said top wall by means of interfitting tabs and slots; and (c) said first and second side walls being rotatably joined to a back wall by means of integral hinge sections.

7. A glare shield for a portable display screen, said display screen having a display surface with a top edge and first and second sides, said shield comprising:

(a) a material, having top and first and second sides, substantially surrounding, respectively, said top edge and said first and second sides of said display surface and extending from said display surface, said top and first and second sides of said shield being being constructed so as to be readily deformable in the event of the application of an external force, to absorb at least a portion of said external force to protect said display screen therefrom; and (b) said material including a layer of closed cell polyethylene foam having on either surface thereof a layer of flocked urethane.

* * * * *